United States Patent
Engl

(10) Patent No.: US 8,909,841 B2
(45) Date of Patent: Dec. 9, 2014

(54) CONFIGURABLE SERIAL INTERFACE

(71) Applicant: Linear Technology Corporation, Milpitas, CA (US)

(72) Inventor: Bernhard Helmut Engl, Colorado Springs, CO (US)

(73) Assignee: Linear Technology Corporation, Milpitas, CA (US)

( * ) Notice: Subject to any disclaimer, the term of this patent is extended or adjusted under 35 U.S.C. 154(b) by 223 days.

(21) Appl. No.: 13/645,322

(22) Filed: Oct. 4, 2012

(65) Prior Publication Data

US 2014/0101349 A1  Apr. 10, 2014

(51) Int. Cl.
*G06F 13/00* (2006.01)

(52) U.S. Cl.
USPC .............................. 710/305; 326/86

(58) Field of Classification Search
USPC ................. 710/100, 104, 305; 326/80, 86
See application file for complete search history.

(56) References Cited

U.S. PATENT DOCUMENTS

| | | | |
|---|---|---|---|
| 6,253,268 B1 * | 6/2001 | Bjorkengren et al. | ........ 710/105 |
| 7,804,339 B2 | 9/2010 | Cheng | |
| 8,495,270 B2 * | 7/2013 | Maruko | ........................ 710/307 |
| 2002/0108011 A1 * | 8/2002 | Tanha | ........................ 710/306 |
| 2011/0264834 A1 * | 10/2011 | Fletcher et al. | ............... 710/104 |

FOREIGN PATENT DOCUMENTS

EP    0 619 548 B1    12/1998

OTHER PUBLICATIONS

"256-Position SPI/I2C Selectable Digital Potentiometer", Analog Devices, AD5161, pp. 1-20.
PCA9502, "8-bit I/O expander with I2C-bus/SPI interface", NXP founded by Phillips, Rev. 03—Oct. 13, 2006, pp. 1-13.

* cited by examiner

*Primary Examiner* — Glenn A Auve
(74) *Attorney, Agent, or Firm* — McDermott Will & Emery LLP

(57) ABSTRACT

Method and system for configuring a serial interface. The system includes one or more input nodes each coupled to a corresponding serial bus. One or more output nodes are coupled to a respective serial bus, each output node having a respective driver. A voltage detection circuit determines the voltage at a configuration node. Mode of serial bus operation is based on the voltage level detected at the configuration node. In at least one mode of serial bus operation, the configuration node is used as a mode select input and power source for at least one output driver.

19 Claims, 4 Drawing Sheets

CONFIGURABLE SERIAL INTERFACE

TECHNICAL FIELD

This disclosure generally relates to the electrical arts, and more particularly to serial interfaces.

DESCRIPTION OF RELATED ART

In recent years there has been an effort to improve flexibility of integrated circuits such that they can be used in different systems. For example, a configurable serial interface may be used in complex signal processing systems, as shown for example in European Patent No. EP0619548 to Cassis et al., ("Cassis"). Cassis uses a mode configuration pin which in a Serial Peripheral Interface Bus (SPI) mode is connected to the chip select signal of SPI, which is active low. Accordingly, when the pin is high, no SPI peripheral is activated. In Cassis leaving the mode configuration pin floating or tying it to ground selects I²C mode, generically referred to as "two-wire interface," with a choice of two I²C addresses.

In another example, the AD5161 device from Analog Devices also has a configurable serial interface which is switched by a configuration pin (i.e., referred to DIS in the datasheet). For example, when the DIS pin is tied low, the serial interface is in SPI mode. When the DIS pin is tied high, the serial interface is in I²C mode. Four additional serial interface pins may be used to provide Serial Data Out (SDO), Serial Data In (SDI), Clock (CLK), and Chip Select (/CS) functionality in SPI mode. Three of these pins are used in I²C mode to provide Serial Data Input/Output (SDA) and Serial Clock Input (SCL) functionality and address select (AD0). For example, in I²C mode, the fourth serial interface pin has no functionality. In total, five pins are used for the configurable serial interface which may allow a choice of only two I²C addresses.

In yet another example, the PCA9502 device made by NXP has a configurable serial interface which is switched by a configuration pin, (i.e., called I2C/SPI in the datasheet). When the I2C/SPI pin is tied low, the serial interface is in SPI mode. When the I2C/SPI pin is tied high, the serial interface is in I²C mode. For example, four additional serial interface pins are used to provide SO, SI, SCLK, /CS functionality in SPI mode. These pins are used in I²C mode to provide SDA and SCL functionality and two address select pins, (e.g., A0 and A1). In total, five pins may be used for the configurable serial interface, which allows choice of sixteen I²C mode addresses by connecting A0 and A1 to various other pins.

Complications may arise when devices tied to a bus are powered by independent voltage sources that are substantially different (e.g., incompatible logic levels are introduced). For example, if the peripheral device is a power supply controller running from a 12V source, while the bus master is a microcontroller or ASIC supplied by 3.3V, complications may arise for which solutions come at considerable circuit design expenditure. In this regard, U.S. Pat. No. 7,804,339 to Cheng discusses some of these complications related to incompatible logic levels.

The foregoing prior art approaches have several disadvantages. For example, in Cassis, the configuration system may be a functional hazard during system power up, in which the chip select line may be undefined for a brief period of time. Furthermore, Cassis does not provide any solution to handle incompatible bus voltage scenarios wherein the integrated circuit with the configurable serial interface runs from a supply voltage substantially different from the supply voltage of the bus master.

As to the AD5161 device discussed above, its open collector output drivers on the SDO/SDA pin, even if they may mitigate some of the issues in the independent supply voltage scenario, they come at considerable cost. For example, in SPI configuration, an external pull-up resistor is required (e.g., which is subject to additional power consumption and loads the output drivers of all devices tied to the bus). Further, it incurs the same speed penalty (or speed/power tradeoff) as known for I²C communications. Accordingly, this approach only offers a crippled SPI interface. Still further, a traditional configurable serial interface of the prior art (such as the AD5161) wastes one pin to accommodate I²C mode. This pin would be better used to increase the number of I²C addresses.

As to the PCA9502 device discussed above, it uses an I²C mode address select scheme based on multiple ways of tying the A1 and A0 pins to any of the two supplies (VDD and VSS) or the serial communications pins (SCL/SDA), providing a choice of up to sixteen I²C addresses. However, in many applications tying address select pins to the serial communication pins creates a potential functional hazard.

Further, the PCA9502 device avoids slowdown of the serial output in SPI mode by providing a full push/pull driver stage. The "high" signal is supplied by the VDD pin of the device. In this regard, the PCA9502 may fail to drive a "high" signal on its serial output that is higher or lower than its own supply voltage VDD in SPI mode.

Both the AD5161 and the PCA9502 devices may have difficulties when their serial interface is connected to another device, such as a microcontroller or application specific integrated circuit (ASIC) acting as the bus master, which has a supply voltage substantially different from the supply voltage of the AD5161 or PCA9502, respectively. For example, noise margins may be degraded to a point where the serial bus communication is impaired. When the supply voltage of the PCA9502 is substantially higher than the supply voltage of such an ASIC (and if used in SPI mode, which is desirable for highest speed), parasitic diodes may be activated in the ASIC, which may lead to excess current and destructive latch-up.

Accordingly, existing approaches to implement a configurable serial interface, as demonstrated in the AD5161 and PCA9502, have many disadvantages. In this regard, Cheng does not even attempt a configurable serial interface. Indeed, Cheng even highlights the challenges of incompatible power supplies in such systems.

In view of the foregoing, it would be desirable to have a configurable serial interface that is fully compatible with both I²C and SPI serial bus systems. It would also be desirable to have a configurable serial interface that accommodates a number of combinations of the supply voltages of the integrated circuits. It would also be desirable to have a configurable serial interface that accommodates the possibly substantially different supply voltages of other devices that may be tied to the serial bus, while the optimum noise immunity is preserved. It would further be desirable to have a configurable serial interface that uses a low pin count and makes efficient use of all these pins in several configurations (e.g., such as SPI and I²C). These desired features may be especially useful for integrated circuits (ICs) having a serial interface for digital circuits but are powered from higher supply voltages than the digital circuits. For example, some applications include different smart switch-mode power supply ICs, power and energy metering ICs, and supply monitoring or sequencing ICs.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below relate to serial interfaces that can be configured. In one aspect, the serial interface can accommodate two or more serial protocols by tying a configuration pin in two or more different ways. In some embodiments, the voltage at the configuration pin (CONF) is connected to an internal power supply line supplying the output driver transistors used to drive a "high" logic level to at least one serial output pin. In other embodiments, the configuration pin may float or act as a logic input.

Figure 1A:
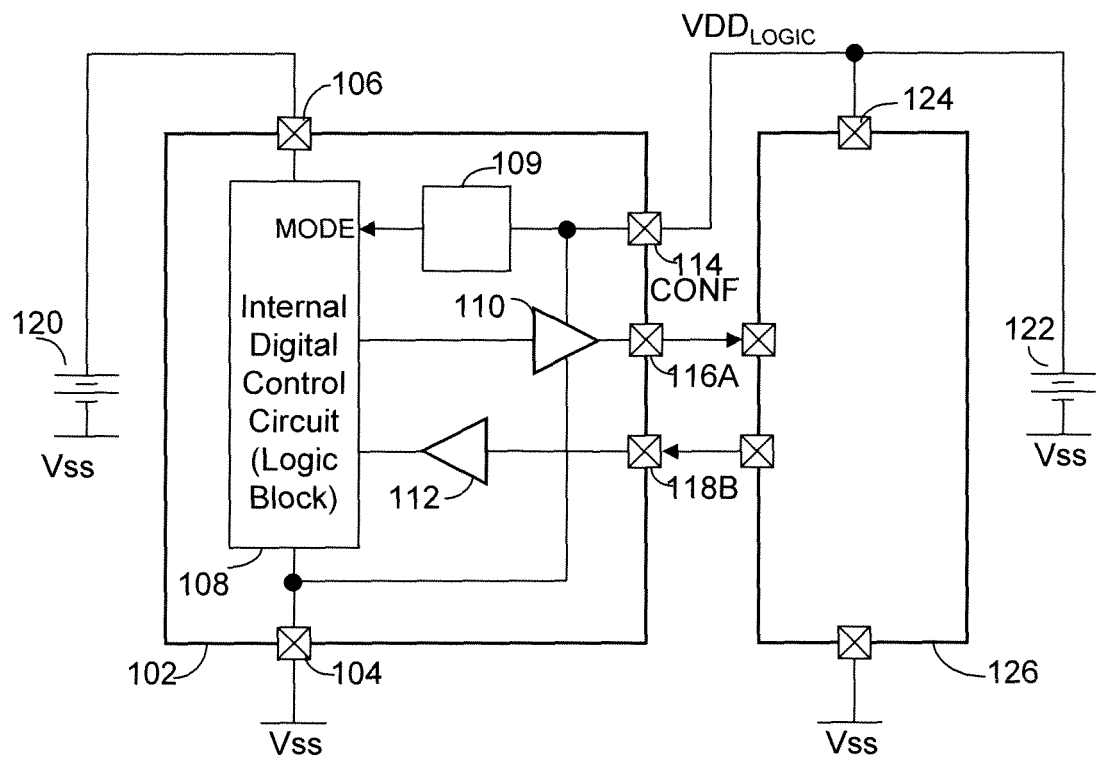
FIG. 1a illustrates an integrated circuit having a configurable serial interface coupled to a bus master in a first mode of serial bus operation, consistent with an embodiment of the present invention.

Reference now is made in detail to the examples illustrated in the accompanying drawings and discussed below. FIG. 1a, illustrates an integrated circuit 102 in a configuration consistent with an embodiment of the present invention. Integrated circuit 102 has a configurable serial interface that can accommodate several serial communication protocols. For example, it can be coupled to different bus master circuits (represented by block 126). Configurable serial interface 102 includes one or more input nodes (e.g., 118B) each coupled to a corresponding serial bus. One or more output nodes (e.g., 116A) are coupled to a respective serial bus, each output node (e.g., 116A) having a respective output driver (e.g., 110). The configurable serial interface 102 includes a configuration node 114 that can be used both as a mode select for serial bus operation and a power source for at least one output driver 110. A voltage detection circuit 109 is configured to detect the presence or absence of a bus supply voltage at the configuration pin 114 (CONF). For example, the voltage detection circuit 109 determines whether the voltage level at the configuration pin is within one or more predetermined voltage ranges. Based on this determination, the voltage detection circuit 109 provides a mode signal to an internal digital control circuit 108, thereby indicating which mode of serial bus to operate under. The digital control circuit 108 controls the serial bus drivers (e.g., 110) and input buffer circuits (e.g., 112) based on mode of serial bus operation. Each block is discussed in more detail below.

Figure 1B:
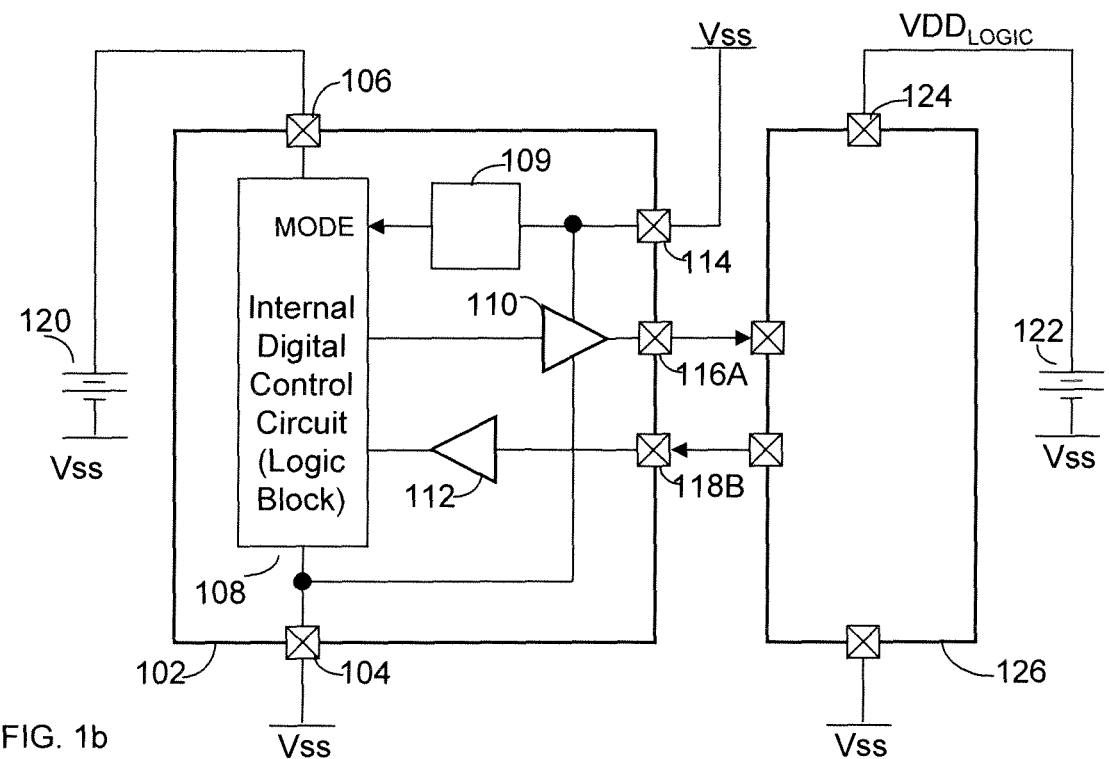
FIG. 1b illustrates an integrated circuit having a configurable serial interface coupled to a bus master in a second mode of serial bus operation, consistent with an embodiment of the present invention.

In the example of FIG. 1a, the configuration pin 114 (CONF) is tied to a serial bus supply voltage 122 (e.g., $VDD_{LOGIC}$) to select a first serial bus protocol (i.e., a mode of serial bus operation). For example, the protocol may be SPI or any other serial bus protocol that uses active driving of defined high voltage levels on serial outputs or status lines. On the other hand FIG. 1b, illustrates an integrated circuit 102 in another configuration consistent with an embodiment of the present invention. In the example of FIG. 1b, the configuration pin 114 is not tied to the serial bus supply voltage of the configuration of FIG. 1a. Rather, the configuration pin 114 is tied to a substantially lower voltage. For example, the substantially lower voltage may be the low voltage pin ($V_{SS}$), as shown in FIG. 1b. The configuration pin 114 (CONF) may also be tied to another pin of the same integrated circuit, or left floating. For example, by connecting the configuration pin to a different voltage, a second serial protocol is selected. In one example, the second serial protocol may be using only open drain drivers at its serial outputs or status lines, (e.g., such as in the I²C protocol).

Independent of or in addition to the configuration pin 114, a plurality of serial input pins, serial output pins, or serial bus control or status pins (e.g., collectively represented by serial bus output pin 116A and serial bus input pin 118B) may be provided, based on the supported serial bus protocols (mode of serial bus operation). For example, power supply pins 106 (e.g., VDD) and ground pins 104 (e.g., $V_{SS}$) are provided to supply the internal digital logic circuit 108 of the integrated circuit 102.

In one embodiment, there is a bus supply voltage detection circuit 109 that is configured to detect the presence or absence of a bus supply voltage at the configuration pin 114 (CONF). The bus supply voltage detection circuit 109 may also provide a mode select logic signal (MODE) to the internal digital control circuit 108. In one embodiment, the mode select signal has at least two states, for example, logic "low" or logic "high."

In one embodiment, at least one output driver circuit 110 is provided. For example, in a first state of the mode select logic signal, the driver circuit 110 of the output node 116A may use a supply voltage (e.g., $VDD_{LOGIC}$ in the example of FIG. 1a) applied to the configuration pin 144 to drive a "high" logic level to a pin (e.g., output node 116A). The output driver circuit 110 may drive a "low" logic level by providing a low ohmic path to the low supply pin 104 (e.g., VSS or ground).

In one embodiment, the integrated circuit 102 includes at least one input buffer circuit 112. For example, the input buffer circuit 112 may discern the logic level at pin 118B and provide the corresponding logic signal to the internal digital control circuit 102.

For better understanding, FIGS. 1a and 1b also show a power supply 120 (which may be a DC power supply) to provide the supply voltage for the integrated circuit 102. Further, a bus master circuit 126 is illustrated that operates under a serial protocol (e.g., such as SPI or I²C). In one embodiment, the bus master circuit 126 is part of a host system. For example, the bus master circuit 126 may be another integrated circuit such as a microcontroller or an ASIC, powered by the host system power supply 122 (which may be a DC power supply). In one embodiment, voltages of power supplies 120 and 122 may be substantially different. In an embodiment that supports two common bus protocols such as SPI and I²C, at least four additional (e.g., pin A (116A), pin B (118B) and pins C and D (not shown)) may be provided. In one example, pins A to D may be configured according to Table 1 below:

TABLE 1

|  | PIN CONF | PIN A | PIN B | PIN C | PIN D |
| --- | --- | --- | --- | --- | --- |
| SPI | $VDD_{LOGIC}$ | SO (out) | SCK (in) | SI (in) | /CS (in) |
| I²C | VSS | SDA (in/out) | SCL (in) | AS1(in) | AS2 (in) |

Figure 2A:
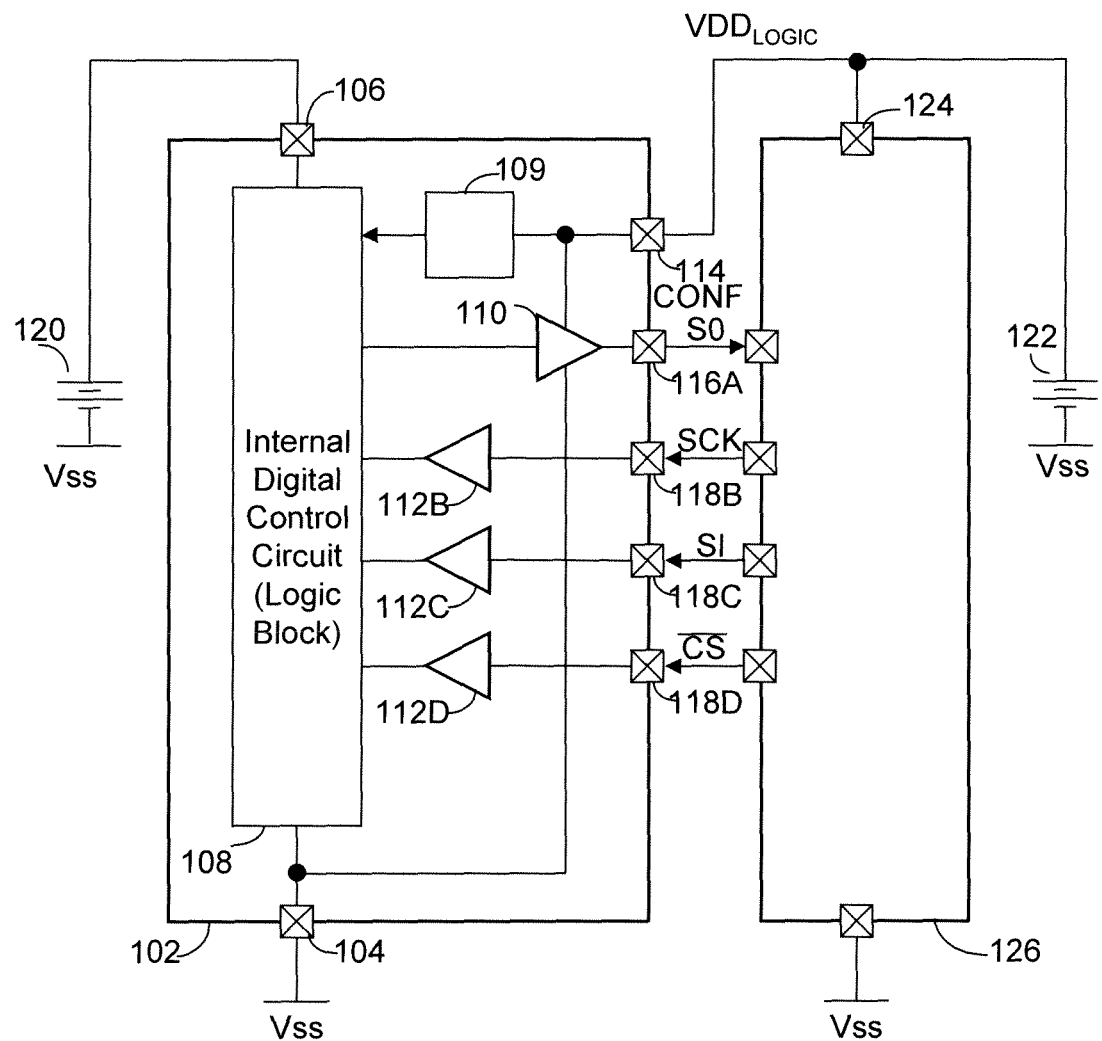
FIG. 2a illustrates an integrated circuit having four control pins coupled to a bus master in a configuration consistent with an embodiment of the present invention.

Reference now is made to FIG. 2a, which illustrates an integrated circuit 102 with four control pins in a configuration consistent with an embodiment of the present invention. In the example of FIG. 2a, in SPI mode the configuration pin 114 (CONF) is tied to a supply voltage $VDD_{LOGIC}$ which may be from the same supply voltage source 122 that supplies the host system's microcontroller or ASIC 126 that is connected to the SPI bus. In one embodiment, the bus supply voltage detection circuit 109 detects the presence of $VDD_{LOGIC}$ at pin 114 (CONF). For example, the internal logic circuit 102 may be configured via the MODE signal such that pin 116A acts as a serial data output (SO), pin 118B acts as a serial clock input (SCK), pin 118C acts as a serial data input (SI) and pin 118D acts as a chip select input (/CS), which in SPI systems may be active low. In the example of FIG. 2a, all the lines on pins 116A to 118D are tied to the bus master 126. However, in some SPI systems that have more than one device on the bus (e.g., other than the master), the SO and SI lines may be daisy chained with other SPI devices.

For example, in SPI mode, the configuration pin 114 (CONF), in addition to serving as a configuration input to configure the digital circuit 108 of the serial interface, may also act as a power supply pin. For example, at least one output driver circuit 110 associated with the serial bus may be powered by the configuration pin 114. In the case of SPI mode, at least the pin driver for the serial data output signal (SO) at pin 116A is powered by the voltage $VDD_{LOGIC}$ connected to the configuration pin 114. The dual use of the configuration pin (e.g., as a power source and a mode select) advantageously reduces the pin count (or frees up the use of a pin for other purposes).

Optionally, (not shown in FIG. 2a), input buffer circuits 112B, 112C, and 112D, (e.g., as seen on pins 118B, 118C, and 118D in the example of FIG. 2a) may also be powered by the voltage $VDD_{LOGIC}$ connected to the configuration pin 114. In one embodiment, by proper scaling of the electronic components used in the input buffer circuits 112B to 112D, the input logic voltage thresholds may be set such that optimum noise immunity on the serial bus is achieved. In one embodiment, circuits similar to those of a Schmitt Trigger may be used as input buffer circuits.

Powering properly scaled input buffer circuits or Schmitt Triggers from the voltage connected to the configuration pin 114 advantageously allows their logic threshold voltage levels to automatically track the supply voltage present on configuration pin 114. In this regard, one skilled in the art will readily understand how to properly scale PMOS and NMOS width and length (W/L) ratios of a CMOS inverter such as to achieve optimum noise immunity.

Figure 2B:
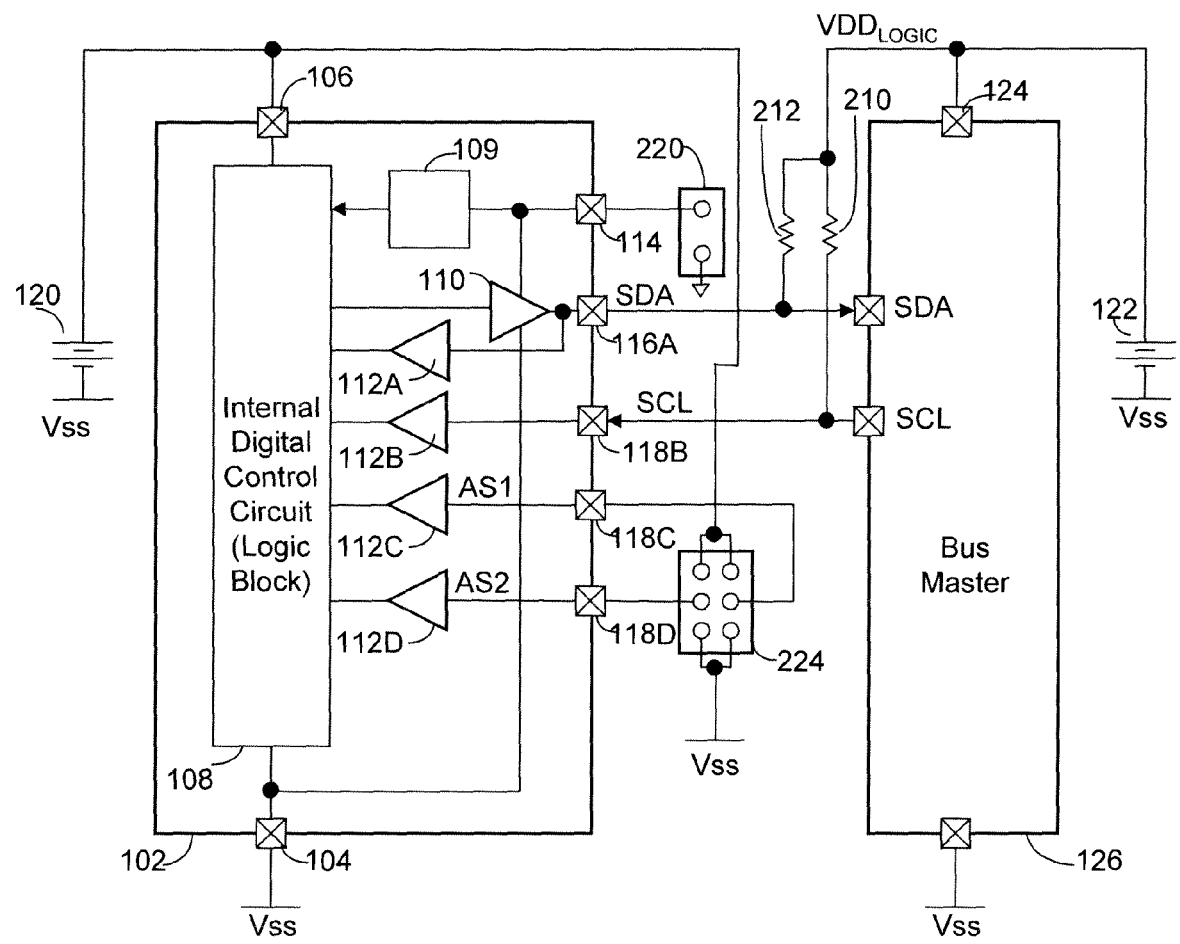
FIG. 2b illustrates an integrated circuit having two control pins coupled to a bus master in a configuration consistent with an embodiment of the present invention.

FIG. 2b illustrates an integrated circuit 102 with four control pins that can accommodate an I²C mode, consistent with an embodiment of the present invention. In the example of FIG. 2b, in I²C mode the configuration pin 114 (CONF) may be tied to a voltage substantially lower than $VDD_{LOGIC}$, (such as the potential on the negative supply voltage or ground pin 104 (e.g., VSS)), or left floating. For example, a jumper block 220 may provide for both possibilities: ground (jumper set) or float (no jumper).

In one embodiment, the bus supply voltage detection circuit 109 detects the absence of $VDD_{LOGIC}$ at the configuration pin 114. The MODE signal at the output of the bus supply voltage detection circuit 109 can be used to implement several functions. For example, by using the MODE signal the internal digital logic circuit 108 may be configured such that pin 116A acts as a serial data input and output (SDA), pin 118B acts as a serial clock input (SCL), pin 118C acts as a first address select input AS1, and pin 118D acts as a second address select input AS2. The bidirectional functionality of pin 116A may be achieved by input buffer 112A, which was not shown in the previous FIG. 2a for simplicity, but may be present on the integrated circuit 102. For example, the input buffer 112A is not used in modes of operation that do not need bidirectional data transfer capability at pin 116A or another pin. In one example, address select inputs AS1 and AS2 may be tied to VDD or VSS by a second jumper block 224. For example, the second jumper block 224 allows selection of up to four I²C addresses by just using these two pins. Optionally, if inputs AS1 and AS2 are provided with a "float" detection circuit, then such a pin (e.g., AS1 and AS2) also may be left floating (e.g., with no jumpers set), thereby allowing for selection of many (e.g., up to nine) I²C addresses with just the two pins. For example, using the float state "F" in a ternary logic based on symbols {0,F,1} the nine combinations 00, 0F, 01, F0, FF, F1, 10, 1F, 11 can be discerned and mapped to nine I²C addresses.

As further regards FIG. 2b, in yet another embodiment, the configuration pin 114 may also be provided with a "float" detection circuit. For example, the addition of the "float" detection circuit allows for two settings of jumper block 220 (i.e., float and ground). These jumper settings may be used to increase the number of selectable I²C addresses to eighteen, without increasing the pin count. Resistors 210 and 212 of FIG. 2b are conventional pull up resistors known from I²C specifications. In one embodiment (e.g., in I²C mode), the output driver circuit 110 operates as a open drain output. An open drain output may be achieved by control circuit 108. For example, when a logic "high" level on the SDA bus line is desired, a driver transistor coupled between pin 116A and pin 114 of the output driver circuit 110 (not shown in FIG. 2b) is not activated by control circuit 108. In this case, output driver circuit 110 does not draw any power from configuration pin 114 and the logic "high" level is provided by resistor 212.

Figure 3:
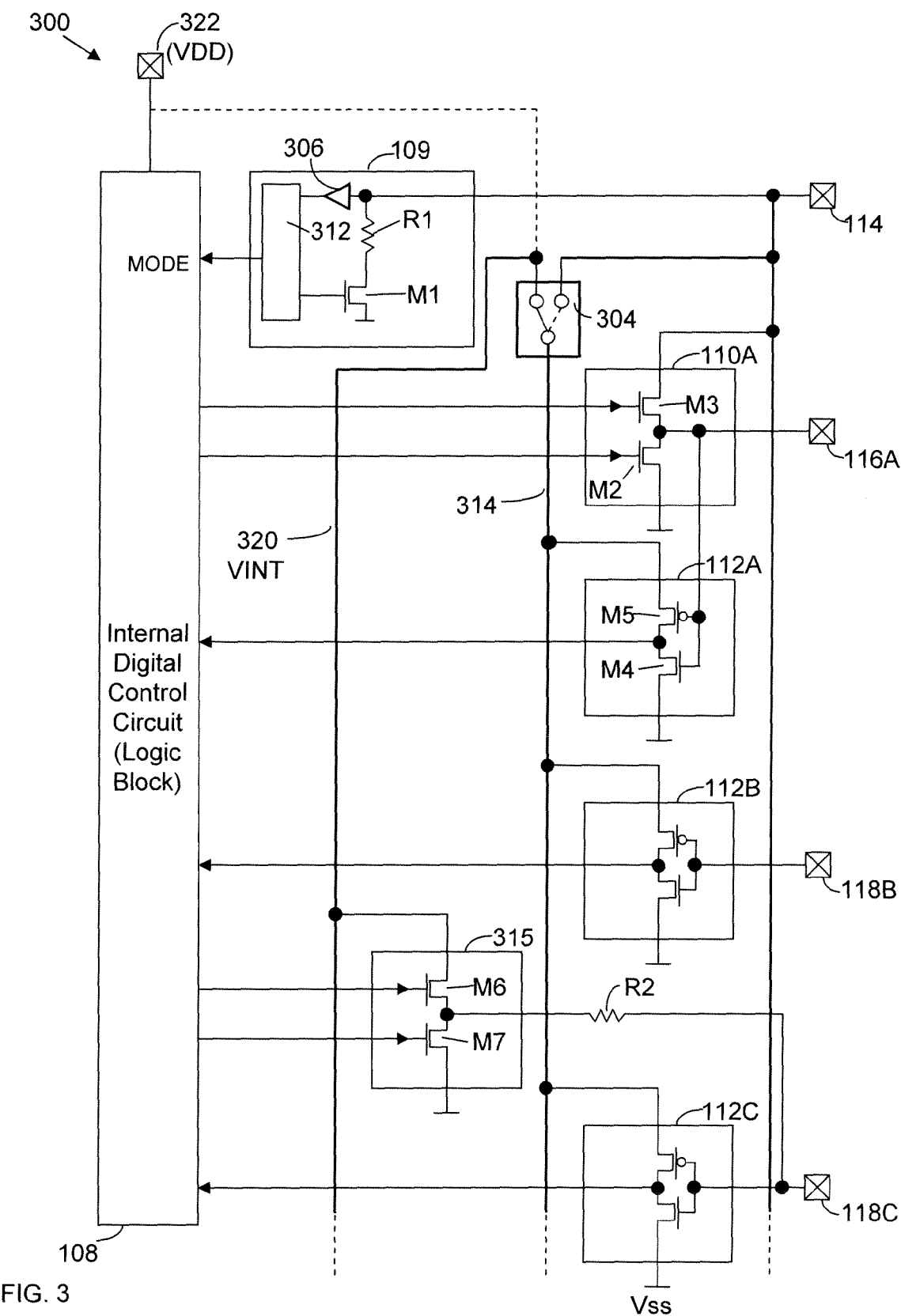
FIG. 3, which illustrates a transistor level configurable serial interface consistent with an embodiment of the present invention.

Reference now is made to FIG. 3, which illustrates a transistor level interface consistent with an embodiment of the present invention. In the example of FIG. 3, bus supply voltage detection circuit 109 includes a pull-down transistor M1, a current limiting resistor R1, a level detector 306 configured to detect "high" and "low" potentials, and a state machine 312. The pull-down transistor M1 has its source coupled to a low voltage node (e.g., Vss, ground, or other current sinking node). In one example, if the pull-down transistor M1 is made weak (e.g., low pull-down strength by having a low W/L ratio), then the current limiting resistor R1 may even be omitted. An exemplary operation of the interface is described below.

For example, the first state of state machine 312 activates transistor M1 and records the logic level on the output of level detector 306. A second state of state machine 312 deactivates transistor M1 and records the logic level on the output of level detector 306. If both recordings show "high" logic level, then state machine 312 enters a state that that indicates the presence of a bus supply voltage at the MODE signal at the output of the state machine 312. Otherwise, state machine 312 enters a state that indicates the absence of a bus supply voltage. In one embodiment, level detector 306 is an inverter having a ratio of the PMOS and the NMOS tailored to have a trip level that lies below the lowest expected valid bus supply voltage to be detected at configuration pin 114. In another embodiment (not shown in FIG. 3), level detector 306 may be a comparator whose first input is coupled to configuration pin 114 and its second input is coupled to a reference voltage. In yet another embodiment, the second comparator input is coupled to the drain of transistor M1 such that the comparator detects a voltage drop over resistor R1 when transistor M1 is activated. For example, the decision of the voltage detection circuit 109 may be based on the actual current flowing through resistor R1 and not on any particular voltage level on the configuration pin 114.

For example, output driver circuit 110A may include two NMOS transistors M2 and M3. Transistor M2 may act as a pull down transistor, and M3 may act as a pull up transistor. Transistor M3 may be directly coupled to the configuration pin 114 to receive the $VDD_{LOGIC}$ voltage supplied (e.g., when in the first mode of operation). In one embodiment, full swing to $VDD_{LOGIC}$ is possible if the gate of M3 is driven high enough, which (among many other possibilities) may be performed with a gate boost circuit known in the art. For example, this solution for implementing push-pull pin drivers for multi supply voltage domains may be simpler than using a PMOS pull-up, which may add complications with parasitic bipolar action (e.g., when either the PMOS drain or its source exceeds the voltage of its bulk). However, if the integrated circuit 300 has an internal voltage source that is greater or equal to the highest expected voltage on the bus, then transistor M3 may alternatively be a PMOS (e.g., where its bulk tied to the internal voltage source).

Input buffer circuits 112A to 112C each may include at least one inverter. In one example, each inverter comprises an NMOS transistor M4 and a PMOS transistor M5. The supply voltage (i.e., at net 314) of the input buffer circuits 112A to 112C may be switched between the voltage level at the configuration pin 114 or an internal voltage 320 (VINT) by using an electronically controlled switch 304. In one embodiment, the internal voltage 320 (VINT) is the supply voltage 322 (VDD) (e.g., as indicated by the dotted connection between the supply voltage 322 (VDD) and the switch 304). Alternatively, the internal voltage 320 (VINT) may be at a trip level setting voltage suitable to set a desired trip point of the input buffer circuits 112A to 112C. In one embodiment, an NMOS source follower (not shown) may derive that trip level setting voltage from the supply voltage VDD. In one embodiment, the trip level setting may be provided by an internal regulator. For example, the logic voltage trip levels may be set for the I²C bus standard.

In one embodiment, a pin (such as the configuration pin 114) that has a level detector 306 or input buffer circuits 112A to 112C coupled thereto, may be provided with a float state detection circuit. For example, a weak push-pull driver stage 315 may be coupled to such pin. In one embodiment, the push-pull driver stage (e.g., 315) is made weak by including a series resistor R2 at the output of transistors M6 and M7, or by making the transistors M6 and M7 themselves weak (e.g., by configuring a small W/L ratio).

In one embodiment, internal digital logic circuit 108 (e.g., a digital control circuit) includes one or more state machines that alternately activate transistors M6 and M7 coupled to a pin (e.g., 118C or 114) and respond to the logic states on the pin detected by an input buffer circuit 112C or a level detector 306. For example, transistors M6 and M7 are toggled to determine how the output reacts to such stimuli. In one embodiment, if both logic states on the pin remain "high," in response to the toggling, it is indicative that the pin is coupled to a high logic level. If both logic states on the pin are remain "low" in response to the toggling, the pin it is indicative that the pin is coupled to a low logic level. However, if it is detected that the logic state on the pin is "high" when transistor M6 is ON and the logic state on the pin is "low" when transistor M7 is ON, then it is indicative that the pin is floating. The remaining condition is invalid and should never happen. In this case the detection process may be repeated until a valid condition is found or some error handling procedure be entered.

In one embodiment, the bus supply voltage detection circuit 109 is coupled to or includes a float state detection circuit (e.g., similar to that of 315). For example, transistor M1 may be replaced with such a weak push-pull driver stage and a similar detection procedure is applied as discussed above. For example, it is advantageous to initiate the bus voltage detection sequence described above first and to proceed with the float state detection sequence only when no bus voltage is present.

In one embodiment, an internal supply voltage regulator (not shown) is used to generate the internal supply voltage VINT from the VDD supply. Put differently, the configuration pin 114 does not need to provide the internal input buffer supply voltage VINT. In this regard, it will be understood that additional analog circuitry and an external capacitor may be used to provide a regulated VINT. In yet another embodiment, the internal digital control circuit 108 also may be powered by VINT in lieu of VDD at the supply voltage pin 322.

The components, steps, features, objects, benefits and advantages that have been discussed herein are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently. For example, bipolar transistors (e.g., PNP or NPN) can be used instead of MOS transistors. A PNP may be used instead of NPN, and a PMOS may be used instead of NMOS. Accordingly, it is intended that the invention be limited only in terms of the appended claims.

What is claimed is:

1. A configurable serial interface comprising:
   a configuration node;
   one or more input nodes each coupled to a respective serial bus;
   one or more output nodes each coupled to a respective serial bus;
   at least one driver configured to drive a respective output node;
   a voltage detection circuit coupled to the configuration node and operative to detect a voltage at the configuration node, wherein:
   the configurable serial interface is operative to set a mode of serial bus operation based on the voltage detected at the configuration node; and
   in at least one mode of serial bus operation, the configuration node is configured both as a mode select input and a power source for at least one driver of an output node.

2. The configurable serial interface of claim 1, wherein the configuration node is:
   (i) coupled to a ground;

(ii) coupled to a VDDLOGIC voltage level; or
(iii) floating.

3. The configurable serial interface of claim 1, wherein:
in a first mode of serial bus operation, the at least one output driver of an output node is configured to provide an output voltage substantially equal to the voltage at the configuration node; and
in a second mode of serial bus operation, the at least one output driver of an output node is configured as an open drain.

4. The configurable serial interface of claim 3, wherein:
the first mode of serial bus operation is Serial Peripheral Interface (SPI), and
the second mode of serial bus operation is I²C.

5. The configurable serial interface of claim 3 wherein when in a second mode of serial bus operation:
a first output node is operative as a serial data input and output (SDA) pin;
a first input node is operative as a serial clock input (SCL) pin;
a second input node is operative as a first address select input (AS1); and
a third input node is operative as a second address select input (AS2).

6. The configurable serial interface of claim 1, wherein a logic threshold level is based on the voltage at the configuration node.

7. The configurable serial interface of claim 1, further comprising at least one input buffer, each input buffer having an input coupled to a respective input node.

8. The configurable serial interface of claim 7, wherein the at least one input buffer is configured as a Schmitt Trigger.

9. The configurable serial interface of claim 1, further comprising a float detection circuit coupled to at least one input node.

10. The configurable serial interface of claim 1, further comprising a float detection circuit coupled to the configuration node.

11. The configurable serial interface of claim 1, wherein the voltage detection circuit comprises:
a pull-down transistor having its drain coupled to the configuration node and its source coupled to a first voltage node;
a state machine coupled to a gate of the pull-down transistor; and
a level detector coupled between the drain of the pull-down transistor and the state machine.

12. The configurable serial interface of claim 11, wherein the level detector comprises an inverter having a PMOS and an NMOS.

13. The configurable serial interface of claim 1, further comprising a digital logic circuit having one or more state machines.

14. A method of configuring a serial interface having at least one output driver, the method comprising:
determining a voltage at a configuration pin;
when the determined voltage is within a first range, entering a first mode of serial bus operation, comprising:
using the voltage at the configuration pin as a mode select input; and
using the voltage at the configuration pin as a power supply for the least one output driver; and
when the determined voltage is within a second range, entering a second mode of serial bus operation, comprising:
configuring the output driver as an open drain.

15. The method of claim 14, wherein:
the first mode of serial bus operation is Serial Peripheral Interface (SPI), and
the second mode of serial bus operation is I²C.

16. The method of claim 14, wherein entering a second mode of serial bus operation comprises:
configuring a first output node as a serial data input and output (SDA);
configuring a first input node as a serial clock input (SCL);
configuring a second input node as a first address select input (AS1); and
configuring a third input node as a second address select input (AS2).

17. The method of claim 14, further comprising adjusting a logic threshold level based on the voltage of the configuration pin.

18. The method of claim 14, further comprising determining whether the configuration pin is floating.

19. The method of claim 14, further comprising determining whether an address select input is floating.

* * * * *